United States Patent [19]

Shinozaki et al.

[11] Patent Number: 4,762,632

[45] Date of Patent: Aug. 9, 1988

[54] ELECTROLYTE FOR ELECTROLYTIC CAPACITOR

[75] Inventors: Fumihiko Shinozaki; Tatsunori Tsuji; Yutaka Yokoyama, all of Ome, Japan

[73] Assignee: Nippon Chemi-Con Corporation, Tokyo, Japan

[21] Appl. No.: 26,747

[22] Filed: Mar. 17, 1987

[30] Foreign Application Priority Data

Mar. 19, 1986 [JP] Japan ................................. 61-61835

[51] Int. Cl.$^4$ ............................................... H01G 9/00
[52] U.S. Cl. .................................... 252/62.2; 361/433
[58] Field of Search .................... 252/62.2; 361/433 E

[56] References Cited

U.S. PATENT DOCUMENTS 3,052,829  9/1962  Ross et al. ...................... 361/433 E
4,107,761  8/1978  Oyama ............................ 361/433 E Primary Examiner—John F. Niebling
Assistant Examiner—Kathryn Rubino

[57] ABSTRACT

An electrolyte for an electrolytic capacitor is disclosed containing an alkyl quarternary ammonium salt of an enol-form of 1,3-diketone compound as solute within an aprotic solvent. The electrolyte exhibits high conductivity while eliminating the drawbacks associated with the presence of water.

4 Claims, No Drawings

ELECTROLYTE FOR ELECTROLYTIC CAPACITOR

FIELD OF INVENTION

An electrolyte for an electrolytic capacitor containing within an aprotic solvent an alkyl quarternary ammonium salt of enol-form of 1,3-diketone compound as solute.

An electrolyte for an electrolytic capacitor according to the invention may conveniently be prepared by adding one equivalent amount of enol-form of 1,3-diketone compound to a methylene chloride solution of alkyl ammonium hydrogen-sulfate for reaction with subsequent addition of two equivalent amounts of alkali hydroxide. A deposit is removed from the reaction product with subsequent vacuum drying to obtain an anhydrous salt and then dissolving said anhydrous salt to an aprotic solvent until a desired conductivity is obtained, for example, as an approximately 10% by weight solution.

BACKGROUND OF THE INVENTION

An electrolytic capacitor is composed by using an anode electrode of the so-called valve metal such as aluminium or tantalum, said metal being caused to form an insulating oxide layer on its surface, said insulating oxide layer acting as a dielectric layer, contacting said insulating oxide layer with an electrolyte layer, arranging a current collector electrode generally referred to as cathode.

The electrolyte for the electrolytic capacitor, as above mentioned, contacts directly with the dielectric layer and acts as a true cathode, that is, the electrolyte lies between the dielectric layer of the electrolytic capacitor and the current collector electrode and hence its resistance is inserted in series for the electrolytic capacitor. Therefore, the characteristic of the electrolyte results in an important factor controlling the chracteristic of the electrolytic capacitor. For example, if a conductivity of an electrolyte is lower, an equivalent series resistance within an electrolytic capacitor is increased and hence a high-frequency characteristic and a loss characteristic may be lowered.

That is the reason of the demand for high conductivity electrolyte and as such a high conductivity electrolyte, a solution of an organic acid or its salt, such as adipic acid in glycols, such as ethylene glycol or alcohols have been used.

The latest expansion of demands of electrolytic capacitors having higher electric characteristics has not been satisfied with the conductivity of the presently available electrolyte. Especially in the case of the presently available electrolyte, when a desired conductivity is not obtained or a low solubility solute is used, the conductivity has been improved by intentionally adding water.

However, in the latest utilizing condition of the electrolytic capacitor required for use at above 100° C. and for many hours, the presence of water causes a dielectric layer to be worsened, an internal vapor pressure of the electrolytic capacitor to be increased and hence the life of the electrolytic capacitor is worsened because of a breakage of a seal part or a volatilization of an electrolyte. Therefore, the present electrolytic capacitor has had as a drawback the inability to hold a stable characteristic over a long term. To solve the matter, it is known that an ammonium or a primary, secondary or tertiary amine salt of an organic acid is used as a solute in an aprotic solvent as disclosed in the Japanese patent publication Nos. 55-3989, 57-56763, 58-32769 and the U.S. Pat. No. 4,117,531.

It has been discovered that an alkyl quaternary ammonium salt of enol-form of 1,3-diketone has a considerable solubility to an aprotic solvent and the solution has an extremely high conductivity of several thousand $\mu s$ (microsiemens), even though an ammonium or a primary, secondary or tertiary amine salt of acetylacetone or other 1,3-diketone is practically insoluble in an aprotic solvent and hence such a solution has substantially no conductivity or an extremely low conductivity of a few or several $\mu s$.

SUMMARY OF THE INVENTION

Thus, a principal object of the invention is to provide an electrolyte of substantially non water series high conductivity with use of the aprotic solvent.

An electrolyte for electrolytic capacitor according to the invention is characterized by containing an alkyl quaternary ammonium salt of enol-form of 1,3-diketone compound in the aprotic solvent as solute.

PREFERRED EMBODIMENTS OF THE INVENTION

The alkyl ammonium salt of an enol-form of 1,3-diketone compound according to the invention is represented by the following general formula,

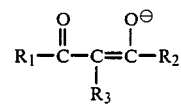

in which $R_1$ and $R_2$ are alkyl group having 1 to 6 carbon atoms or aryl group, $R_3$ is hydrogen atom, alkyl group having 1 to 6 carbon atoms or aryl group and A is alkyl ammonium comprising 1 to 4 alkyl groups having 1 to 6 carbon atoms.

The 1,3-diketone compound to be preferably used in the invention may be selected from the following but not limited thereto:
acetylacetone[$CH_3COCH_2COCH_3$], benzoylacetone[$CH_3COCH_2COC_6H_5$], dibenzoylmethane[$C_6H_5COCH_2COC_6H_5$], di-tert-butylacetylacetone[$(CH_3)_3CCOCH_2COC(CH_3)_3$] or 3-methyl-2,4-pentanedione[$CH_3COCH(CH_3)COCH_3$].

The alkyl ammonium to be preferably used in the invention may be selected from the following but not limited thereto:
tetramethylammonium, tetraethylammonium, tetrabutylammonium, trimethylammonium, dihexylammonium, hexylammonium.

The aprotic solvent to be used in the invention may be selected from the following but not limited thereto:

(1) Amide system solvent:
N-methylformamide, N,N-dimethylformamide, N-ethylformamide, N,N-diethylformamide, N-methylacetamide, N,N-dimethylacetamide, N-ethylacetamide, N,N-diethylacetamide, hexamethylphosphorinamide (2) Oxide compounds:
dimethyl sulfoxide (3) Nitrile compounds:
acetonitrile (4) Cyclic esters, cyclic amides:

γ-butyrolactone, N-methyl-2-pyrrolidone, ethylene carbonate, propylene carbonate.

An electrolyte for an electrolytic capacitor according to the invention may conveniently be prepared by adding one equivalent amount of enol-form of 1,3-diketone compound to a methylene chloride solution of alkyl ammonium hydrogensulfate for reaction with subsequent addition of two equivalent amounts of alkali hydroxide. A deposit is removed from the reaction product with subsequent vacuum drying to obtain an anhydrous salt and then dissolving said anhydrous salt to an aprotic solvent until a desired conductivity is obtained, for example, as an approximately 10% to 15% by weight solution.

(EXAMPLES 1 TO 5)

An electrolyte for an electrolytic capacitor according to the invention will be exemplified in the following with 10% to 15% by weight solution for alkyl ammonium salt of various enol-forms of 1,3-diketone compounds with respect to the conductivity as shown in Table 1.

Further, as a comparative example the conventional standard electrolytes composed of 78% by weight of ethylene glycol, 12% by weight of water and 10% by weight of ammonium adipate are shown also in Table 1.

TABLE 1

| Example | Formulation of electrolyte | Weight (%) | Conductivity (ms/cm) |
|---|---|---|---|
| 1 | tetramethylammonium acetylacetonate 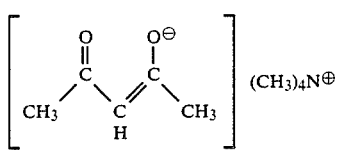 | 10 | 9.9 |
|  | γ-butyrolactone | 90 |  |
| 2 | tetraethylammonium benzoylacetonate 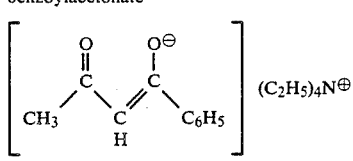 | 15 | 12.0 |
|  | N—methylformamide | 85 |  |
| 3 | tetrabutylammonium diphenylacetylacetonate 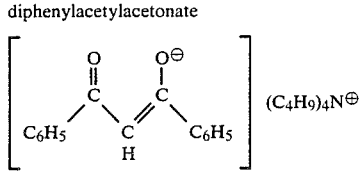 | 15 | 8.1 |
|  | acetonitrile | 85 |  |
| 4 | tetramethylammonium di-tert-butylacetylacetonate 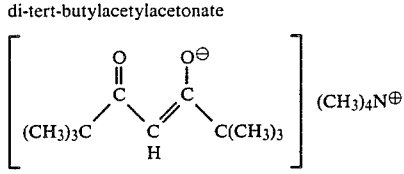 | 15 | 8.9 |
|  | N—methylpyrrolidone | 85 |  |
| 5 | tetraethylammonium 3-methyl-2,4-pentanedionate 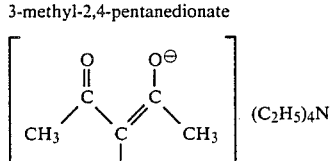 | 10 | 11.6 |
|  | N,N—dimethylformamide | 90 |  |
| Ref. | ethylene glycol | 78 |  |
|  | water | 12 | 6.7 |
|  | ammonium adipate | 10 |  |

As understandable from the result above, the electrolyte of the present invention has higher conductivity than that of the conventional electrolyte.

Further, a series of electrolytic capacitors for comparative test are prepared with the electrolytes of examples and each of the capacitor characteristics is compared.

The electrolytic capacitor for the test is prepared by rolling three layers superposed a cathode and an anode of aluminium foil and a separator paper between them to form a cylindrical capacitor element. The capacitor element is impregnated with each of electrolytes of the examples and then is introduced into an external case and sealed respectively.

Each electrolytic capacitor consists of the same dimentional capacitor element having 16 V rated voltage and 180 μF rated capacity.

The actual high-temperature load test obtained at 16 WV 180 micro F for electrolytes exemplified in examples 1 to 5 and the comparative example are shown at the mean value of 10 load tests in Table 2.

TABLE 2

| Example | Initial Value | | | 110 deg. C. 1000 hours | | |
|---|---|---|---|---|---|---|
| | Capacity μF | tan δ | Leakage Current μA | Capacity μF | tan δ | Leakage Current μA |
| 1 | 178 | 0.072 | 0.50 | 174 | 0.075 | 0.45 |
| 2 | 181 | 0.066 | 0.52 | 172 | 0.073 | 0.47 |
| 3 | 178 | 0.078 | 0.55 | 162 | 0.083 | 0.48 |
| 4 | 178 | 0.075 | 0.54 | 171 | 0.078 | 0.49 |
| 5 | 181 | 0.067 | 0.51 | 172 | 0.069 | 0.47 |
| Ref. | 177 | 0.086 | 0.75 | 152 | 0.132 | 0.74 |

As understandable from the result above, the electrolytic capacitor using the electrolyte of the present invention has the lower capacitor losses or tan δ as compared with that of the conventional electrolyte because of the higher conductivity of the electrolyte of the present invention.

Furthermore, as the result of the essentially nonaqueous system, the electrolytic capacitor using the electrolyte of the present invention shows no abnormal exterior or decrease of the electrostatic capacity due to the increase of the internal pressure and the extremely few changes of the characteristic values in comparison of the initial value with the value after the load test.

The electrolyte according to the invention may provide the electrolytic capacitor for the power device such as the switching regulator used at high frequency and requiring high efficiency and for various electrical machineries and apparatuses used at high temperature for a long term because of the maintenances of the lower capacitor losses and the stable characteristic used at high temperature for a long term.

What is claimed is:

1. An electrolyte for an electrolytic capacitor comprising an aprotic solvent and an alkyl ammonium salt of an enol-form of 1,3-diketone compound of general formula,

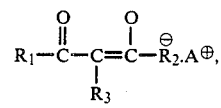

in which $R_1$ and $R_2$ are alkyl group having 1 to 6 carbon atoms or aryl group, $R_3$ is hydrogen atom, alkyl group having 1 to 6 carbon atoms or aryl group and A is alkyl ammonium comprising 1 to 4 alkyl groups having 1 to 6 carbon atoms.

2. An electrolyte for an electrolytic capacitor according to claim 1, wherein the aprotic solvent is selected from the group of N-methylformamide, N,N-dimethylformamide, N-ethylformamide, N,N-diethylformamide, N-methylacetamide, N,N-dimethylacetamide, N-ethylacetamide, N,N-diethylacetamide, γ-butyrolactone, N-methyl-2-pyrrolidone, ethylene carbonate, propylene carbonate, dimethyl sulfoxide, acetonitrile or the mixture thereof.

3. An electrolyte for an electrolytic capacitor according to claim 1, wherein the 1,3-diketone compound is selected from the group of acetylacetone, benzoylacetone, dibenzoylmethane, di-tert-butyl-acetylacetone or 3-methyl-2,4-pentanedione.

4. An electrolyte for an electrolytic capacitor according to claim 1, wherein the alkyl ammonium is selected from the group of tetramethylammonium, tetraethylammonium, tetrabutylammonium, trimethylammonium, dihexylammonium, hexylammonium.

* * * * *